United States Patent Office 3,337,787
Patented Aug. 22, 1967

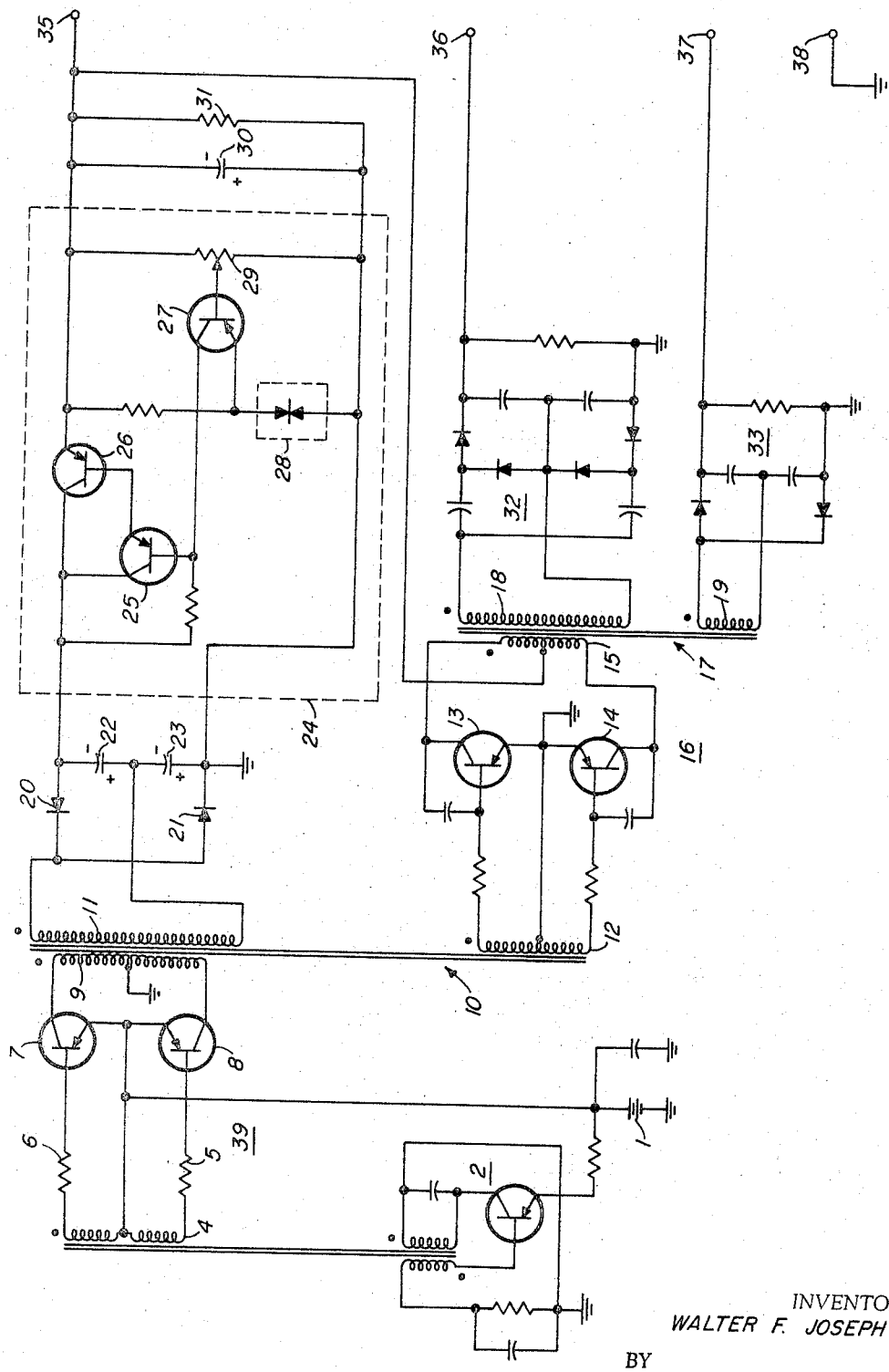

3,337,787
DIRECT CURRENT POWER SUPPLY HAVING PLURAL REGULATED OUTPUTS
Walter F. Joseph, San Carlos, Calif., assignor to the United States of America as represented by the Secretary of the Navy
Filed Sept. 24, 1964, Ser. No. 398,818
1 Claim. (Cl. 321—2)

ABSTRACT OF THE DISCLOSURE

A power supply for producing a plurality of relatively high voltage regulated D.C. voltages from a single low voltage unregulated D.C. source while using only a single series type regulator circuit. The low voltage D.C. source is chopped and supplied to a transformer having multiple output windings. The output of one winding is rectified and fed through a series regulator circuit to produce a low voltage regulated D.C. signal. The latter signal is used as a supply voltage for a saturated push-pull amplifier. The amplifier is triggered by signals from another output winding of said transformer. The output of the amplifier is therefore regulated in magnitude and can be used to drive another transformer having multiple output windings with each such winding being associated with a rectifying circuit. A multiple of regulated output voltages are thereby produced.

---

The invention described herein may be manufactured and used by or for the Government of the United States of America for governmental purposes without the payment of any royalties thereon or therefor.

The present invention relates to apparatus for providing a plurality of regulated DC outputs from an unregulated input, or more particularly, for providing a plurality of regulated high voltage DC outputs from a single low voltage DC source such as a battery.

It is often desirable, or many times necessary, in a variety of electronics applications, to have available a plurality of regulated DC voltages of various magnitudes ranging from low to high values. In many instances the available power source is unregulated and of low voltage, for example, a battery.

An object of this invention, therefore, is to provide a plurality of regulated DC voltages from a single unregulated source.

Another object of this invention is to provide a plurality of regulated DC voltages of various magnitudes from a single DC source such as a battery.

Regulated power supplies currently in use utilize two types of regulator circuits—shunt regulators and series regulators. With presently available transistors and reference (zener) diodes, these regulators are limited to relatively low voltage applications. Their use in regulating high voltages, directly, is therefore limited.

Furthermore, a separate regulator circuit is required for each different voltage output. The use of plural regulators not only multiplies the required circuitry but also increases the size and weight of the equipment which for many applications must be miniaturized as much as possible.

A further object of this invention, therefore, is to provide multiple regulated high voltage DC outputs while utilizing a minimum quantity of regulation circuitry, to wit, a single series-type regulator.

In accordance with this invention, the DC voltage of a battery is converted to an alternating voltage by means of conventional oscillator means. It should be noted, however, that the alternating voltage could be obtained directly from some other AC source. The resultant alternating current is then coupled to a rectifier and regulator circuit and also to an electronic switching means, for example, a saturated push-pull amplifier. The amplifier is operated in its saturated mode so that the magnitude of its output voltage is dependent only on the magnitude of its DC supply voltage. The alternating input to the amplifier serves merely to trigger the amplifier into an "off" or "on" condition. By supplying the DC input of the amplifier with the regulated voltage produced by the rectifier-regulator means, the net result is that the output of the amplifier is regulated. The output is then connected to a power transformer, of the ordinary variety, having multiple secondary windings. Any conventional rectification and filtering means may then be attached to the secondary windings to produce the desired DC voltages.

The above and other objects and features of the invention will be more fully understood from the following detailed description and accompanying drawing wherein the single figure is a schematic diagram of an embodiment of the power supply of the present invention.

In the figure, DC source or battery 1 is used to power a class C transistor oscillator 2 of conventional design. The output of this oscillator is a sine wave whose frequency, for example, is approximately 2 kc. By means of transformer 3 having a winding 4, the output of oscillator 2 is used to drive a saturated push-pull amplifier 39. Amplifier 39 comprises transistors 7 and 8, resistors 5 and 6, and primary winding 9 of transformer 10. Since amplifier 39 is operated in a saturated condition, its output is a square wave. Amplifier 39 also receives its DC supply voltage from source 1. The square wave appearing on the primary 9 of transformer 10, is coupled to secondary 11 where it is then rectified and filtered by diodes 20 and 21 and filter capacitors 22 and 23. In the particular embodiment, elements 20 through 23 are connected in a voltage-doubling configuration. The filtered DC voltage thus obtained is then fed to the input of series voltage regulator 24.

Regulator 24 is comprised of transistors 25, 26 and 27, zener diode 28 and variable resistor 29. The regulated output voltage of regulator 24 may be adjusted within certain limits by variable resistor 29. The DC output of regulator 24 is further filtered by filter capacitor 30 and bleeder resistor 31. At terminal 35, there is therefore available a filtered regulated voltage which, by way of example, is of the order of 10 volts in this particular embodiment.

Transformer 10 also has another secondary winding 12 which functions to provide a driving signal for amplifier 16. Amplifier 16 is operated in its saturated mode in much the same manner as amplifier 39. Transistors 13 and 14 of amplifier 16 and center tapped primary winding 15 of transformer 17 are arranged in a push-pull configuration.

By operating the push-pull amplifier in its saturated region, as discussed above with reference to amplifier 39, the resultant output signal is a square wave. Transistors 13 and 14 are therefore essentially being operated as switches, being triggered to their "on" or "off" positions by driving voltage supplied from secondary winding 12. Amplifiers 39 and 16 could therefore be thought of as being electronic switching means. The magnitude of the square wave voltage appearing on primary 15 is therefore solely dependent on the magnitude of the voltage supply to the collectors of transistors 13 and 14. Said collector voltage is supplied through the center tap of primary winding 15 and is obtained from the output of the regulator 24. Since the magnitude of the output of amplifier 16 is solely dependent on the magnitude of the applied collector voltage, and since said collector voltage is regulated, the output of amplifier 16 is also regulated.

It may be further noted that the magnitude of the square wave at the output of amplifiers 39 and 16, is very nearly four times the DC supply voltage which powers each of said amplifiers. The actual voltage differs from exactly four times the applied DC voltage only by the IR losses in the transformer winding and the saturation resistance of the transistors, both of which losses are negligibly low. Furthermore, any change in such losses caused by temperature, aging, etc., is negligible.

By choice of the proper turns ratio in power transformer 17, any desired voltages are available at secondaries 18 and 19. Obviously, further secondary windings could be provided if so desired. Rectifier-filter means 32 and 33 which, in the particular embodiment, are a voltage quadrupler and a voltage doubler, respectively, function to provide a filtered DC voltage at terminals 36 and 37, respectively. Terminal 38 is merely a common ground connection for output voltages available at terminals 35 through 37.

The use of voltage quadruplers or doublers in the output of transformer 17 results in a reduction of the turns required in secondary windings 18 and 19 and, therefore, a reduction in weight. Any desired rectifier-filter combination could, of course, be substituted for the ones of the particular embodiment without departing from the spirit and scope of this invention.

By way of example the instant supply provides regulated outputs of 10, 40, and 700 volts DC from a battery input of 2.5 volts.

While the invention has been described by means of a specific example and in a specific embodiment, it is not limited thereto, for obvious modifications will occur to those skilled in the art without departing from the spirit and scope of the invention.

What is claimed is:

Apparatus for providing a plurality of regulated direct-current outputs from a single unregulated input comprising:

- a source of unregulated D.C. voltage,
- oscillator means connected to said source of D.C. voltage for providing an alternating signal from said D.C. voltage,
- means for amplifying the alternating signal from said oscillator,
- first transformer means having a single primary winding and at least two secondary windings with said primary being connected to receive amplified alternating signals from said means for amplifying,
- a series-type regulator circuit for producing a voltage-regulated D.C. signal,
- rectifying means for supplying signals from one of said two transformer secondary windings to said regulator circuit,
- electronic switching means connected to said regulator and to another of said two transformer secondary windings and arranged to produce an alternating output signal having a magnitude responsive to the voltage regulated D.C. signal from said regulator,
- second transformer means having a primary at a plurality of secondary windings,
- said second transformer means primary being connected to receive said output signal from said switching means,
- each of said plurality of said second transformer secondary windings having associated with it a rectifying circuit whereby a plurality of regulated D.C. output voltages are available.

References Cited
UNITED STATES PATENTS

| | | | |
|---|---|---|---|
| 2,897,432 | 7/1959 | Jackson | 323—22 |
| 2,968,739 | 1/1961 | Mohler | 321—2 |
| 3,192,464 | 6/1965 | Johnson et al. | 321—2 |

FOREIGN PATENTS

| | | |
|---|---|---|
| 826,783 | 1/1960 | Great Britain. |

OTHER REFERENCES

IEE Paper No. 2984 E, Practical Design Problems in Transistor DC/DC Convertors and DC/AC Inverters, April 1960.

JOHN F. COUCH, *Primary Examiner.*

W. H. BEHA, *Assistant Examiner.*